United States Patent [19]

Nakaya et al.

[11] Patent Number: 4,698,379
[45] Date of Patent: Oct. 6, 1987

[54] MAGNESIUM HYDROXIDE, PROCESS FOR ITS PRODUCTION AND RESIN COMPOSITION CONTAINING IT

[75] Inventors: Keiichi Nakaya, Chiba; Kunio Tanaka, Ichihara; Fukuo Kanno; Mitaka Kobayashi, both of Yokohama, all of Japan

[73] Assignee: Asahi Glass Company Ltd., Tokyo, Japan

[21] Appl. No.: 819,409

[22] Filed: Jan. 16, 1986

[30] Foreign Application Priority Data

Jan. 19, 1985 [JP] Japan .................................. 60-6707
Jan. 19, 1985 [JP] Japan .................................. 60-6708

[51] Int. Cl.[4] ............................................. C01F 5/16
[52] U.S. Cl. ................................. 523/513; 423/635; 423/636; 423/638; 423/639; 523/200; 523/512; 524/413; 524/425; 524/430; 524/436
[58] Field of Search .............. 423/635, 636, 638, 639; 523/200, 512, 513; 524/413, 425, 430, 436

[56] References Cited

U.S. PATENT DOCUMENTS

| 1,348,933 | 8/1920 | Dolbear | 423/638 |
| 1,986,509 | 1/1935 | MacIntire | 423/638 |
| 4,075,311 | 2/1978 | Eustacchio | 423/636 |

FOREIGN PATENT DOCUMENTS

| 121345 | 4/1946 | Australia | 423/639 |
| 2624065 | 12/1976 | Fed. Rep. of Germany | 423/635 |
| 100918 | 6/1982 | Japan | 423/635 |
| 403860 | 1/1934 | United Kingdom | 423/638 |
| 693108 | 6/1953 | United Kingdom | 423/639 |
| 939467 | 10/1963 | United Kingdom | 423/639 |
| 967954 | 10/1982 | U.S.S.R. | 423/636 |

Primary Examiner—John Doll
Assistant Examiner—Wayne A. Langel
Attorney, Agent, or Firm—Oblon, Fisher, Spivak, McClelland & Maier

[57] ABSTRACT

Magnesium hydroxide of a substantially spherical particle form having an average particle size of from 5 to 500 μm and a specific surface area of from 25 to 1 m²/g.

15 Claims, 4 Drawing Figures

MAGNESIUM HYDROXIDE, PROCESS FOR ITS PRODUCTION AND RESIN COMPOSITION CONTAINING IT

The present invention relates to magnesium hydroxide, a process for its production and a resin composition containing it. More particularly, it relates to highly dense magnesium hydroxide particles having a large particle size and good roundness, and to their application to a resin composition.

Heretofore, magnesium hydroxide was prepared usually by decarbonizing sea water, followed by the reaction with calcium hydroxide, sodium hydroxide or ammonia to obtain magnesium hydroxide precipitates, which were separated as a product (i.e. so-called sea water magnesium hydroxide). Such sea water magnesium hydroxide had a large porosity and poor roundness, and the particle strength was so small that it could be readily crushed even by fingers into fine particles.

On the other hand, as a method for producing highly pure magnesium hydroxide, it has been proposed to subject basic magnesium chloride to hydrothermal treatment (Japanese Unexamined Patent Publication No. 115799/1977). By this method, it is possible to obtain fairly dense magnesium hydroxide. However, magnesium hydroxide particles are all primary particles, and accordingly in most cases, their average particles size is not higher than 1 $\mu$m.

As mentioned above, the conventional magnesium hydroxide was either highly porous particles (i.e. not dense) or primary particles having small particle sizes although such primary particles had fairly high density.

Further, magnesium hydroxide has been used as a thickner. As the mechanism, it is known to react with an ester bond or a terminal carboxylic acid group [see Kunstoff 60, 1066 (1970)]. By utilizing this mechanism, SMC (sheet molding compound) or BMC (bulk molding compound) is prepared by incorporating from 0.5 to 3.0 PHC of magnesium hydroxide as a thickner and other inorganic fillers into an unsaturated polyester resin, and it is commercially available as a molding material.

A usual curable composition is prepared by dispersing into a curable compound suitable additives such as talc, calcium carbonate or other inorganic fillers, a curing agent, a reinforcing agent, a stabilizer, a pigment, etc., as the case requires. Such a composition is formed into a shaped article by potting, injection molding or heat press molding.

When 50% by weight of conventional magnesium hydroxide is blended to a curable compound having an ester bond and/or a carboxylic acid group, such as an unsaturated polyester resin or a methyl methacrylate resin syrup, the viscosity increases extremely in a few minutes, whereupon kneading is no longer possible.

Like aluminum hydroxide, magnesium hydroxide releases water when heated. Therefore, it is conceivable to use it as an inorganic filler for a flame retardant. However, as mentioned above, the conventional magnesium hydroxide reacts with the ester bond to increase the viscosity, whereby it is difficult to incorporate a substantial amount of such magnesium hydroxide.

Accordingly, it is an object of the present invention to provide magnesium hydroxide having high density, good roundness and large particle size, which has not been known before, a process for the production of such magnesium hydroxide, and a resin composition which is capable of being molded without excessive thickening even when magnesium hydroxide is incorporated in a high proportion.

Namely, the present invention provides magnesium hydroxide of a substantially spherical particle form having an average particle size of from 5 to 500 $\mu$m and a specific surface area of from 25 to 1 $m^2/g$.

The present invention provides also a process for producing magnesium hydroxide, which comprises reacting an aqueous solution containing a water-soluble magnesium salt, with ammonia while controlling the load for crystallization of magnesium hydroxide at a level of not higher than 500 $kg/m^3$·hr and the magnesium hydroxide slurry concentration in the crystallization apparatus at a level of from 1 to 60% by weight, to have magnesium hydroxide slurry crystallized as substantially spherical particles having an average particle size of from 5 to 500 $\mu$m and a specific surface area of from 25 to 1 $m^2/g$.

Further, present invention provides a resin composition prepared by blending a curable compound having an ester bond and/or a carboxylic acid group and containing an unsaturated bond, or a mixture containing such a curable compound, with from 5 to 85% by weight, based on the curable compound, of magnesium hydroxide particles of a substantially spherical particle form having an average particle size of from 5 to 500 $\mu$m and a specific surface area of from 25 to 1 $m^2/g$ as measured by BET method, followed by curing, or a resin composition comprising (a) from 15 to 50% by weight of a curable compound having an ester bond and/or a carboxylic acid group and containing an unsaturated bond, or a mixture containing such a curable compound, (b) from 50 to 84% by weight of a mixture of aluminum hydroxide and magnesium hydroxide of a substantially spherical particle form having an average particle size of from 5 to 500 $\mu$m and a specific surface area of from 25 to 1 $m^2/g$ as measured by BET method, the amount of the aluminum hydroxide being not higher than 20% by weight, and (c) from 1 to 35% by weight of at least one additive selected from the group consisting of asbestos, glass powder, calcium carbonate, calcium silicate, kaolin, talc, clay, glass fiber, carbon fiber, metal fiber, potassium titanate fiber, mica, crystalline or non-crystalline quartz powder, "silus" (pumice flow, pumice fall deposit and vulcanic acid deposit) balloons, glass balloons, glass beads and alumina.

Now, the present invention will be described in detail with reference to the preferred embodiments.

The magnesium hydroxide of the present invention is preferably a secondary particle formed by aggregation of a number of primary particles.

In the accompanying drawings.

Figure 1:
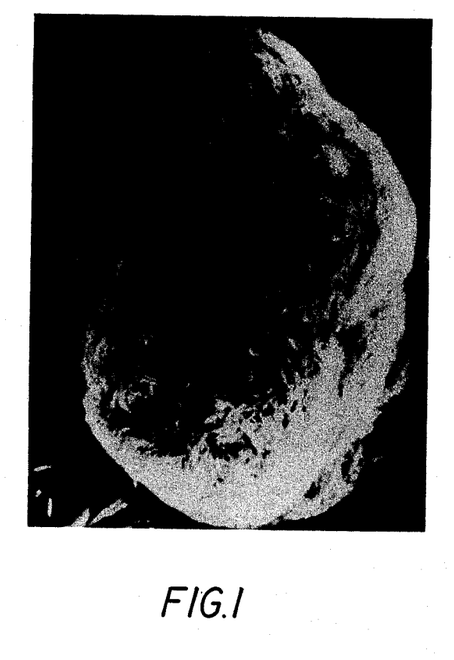
FIG. 1 is an electron microscopic photograph with 5000 magnifications showing the particle structure of a secondary particle having an average particle size of 17.3 $\mu$m as an embodiment of magnesium hydroxide of the present invention.
Figure 2:
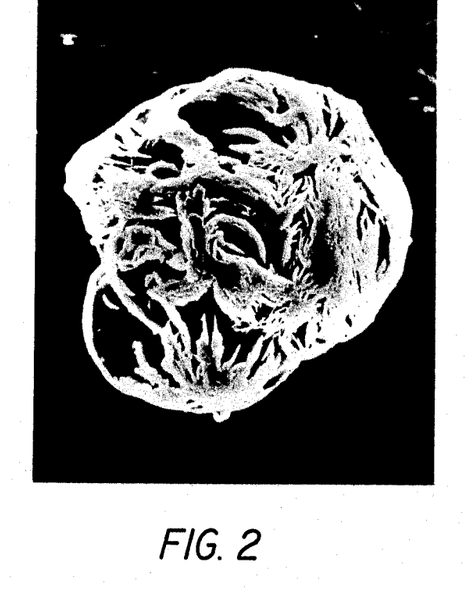
FIG. 2 is an electron microscopic photograph with 5000 magnifications showing the particle structure of a secondary particle having an average particle size of 13.6 $\mu$m as another embodiment of magnesium hydroxide of the present invention.
Figure 3:
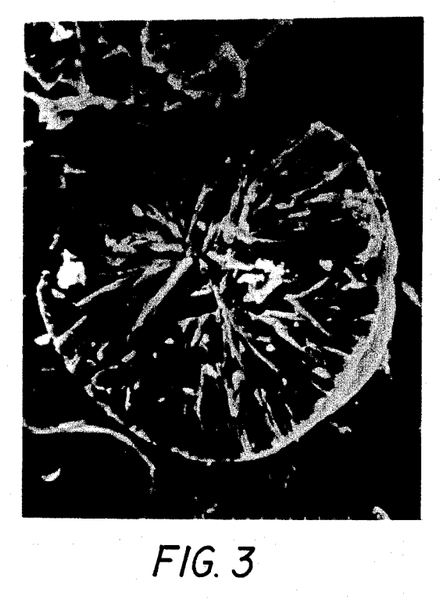
FIG. 3 is an electron microscopic photograph with 2000 magnifications showing the cross-sectional particle structure of a secondary particle having an average particle size of 35 $\mu$m as a still further embodiment of magnesium hydroxide of the present invention.

The magnesium hydroxide of the present invention is a substantially spherical particle having a large size as shown in FIGS. 1 and 2. The average particle size is usually from 5 to 500 μm, preferably from 10 to 350 μm. The magnesium hydroxide of the present invention is a secondary particle formed by aggregation of a number of primary flake particles which are observed like strings on the surface of the secondary particle in FIG. 1 or 2. These primary flake particles are firmly bonded to one another and can not be disintegrated into the primary particles even when subjected to mechanical treatment. Further, as shown in FIG. 3, the primary particles are oriented substantially radially outwardly from the center of the secondary particle. The primary particles are densely arranged and firmly intertwined or bonded to one another as mentioned above. Accordingly, void spaces among the primary particles in the secondary particle are very small.

From the above-mentioned particle structure of magnesium hydroxide of the present invention, the specific surface area (as measured by BET method) is very small at a level of from 25 to 1 m$^2$/g, preferably from 20 to 1 m$^2$/g, as compared with from 30 to 100 m$^2$/g of conventional sea water magnesium hydroxide.

As a result, the magnesium hydroxide particle of the present invention has a packing apparent specific gravity of at least 0.8, preferably at least 0.9, which is substantially larger than the packing apparent specific gravity of about 0.6 of conventional sea water magnesium hydroxide.

Here, the packing apparent specific gravity means an apparent specific gravity of the particles which are densely packed. Specifically, it is the value measured by "Powder Tester" manufactured by Hosokawa Micron K.K.

The primary particles constituting the magnesium hydroxide of the present invention are flakes. The thickness of the flakes is within a range of from 100 to 5000 Å, although it depends upon the size of the secondary particle. The primary flake particles gradually grow in the direction of the plain of each flake with slight growth in the thickness direction in correspondence with the growth of the secondary particle. Each primary flake particle is composed of a single crystal or polycrystals. Crystallographically, the strain of the primary particles in the <101> direction is not higher than $4\times10^{-3}$. The measurement of the strain in the <101> direction is conducted by the method disclosed in Japanese Unexamined Patent Publication No. 115799/1977.

Further, the magnesium hydroxide of the present invention has good flowability and thus has a small angle of repose.

The magnesium hydroxide of the present invention has good light transmission properties since primary flake particles are arranged substantially radially therein.

As mentioned above, the magnesium hydroxide secondary particle of the present invention is highly dense, and the pores in the particle are very small, and the pore volume is likewise very small. Specifically, the total pore volume of pores having pore sizes of at most 0.5 μm in the secondary particle is not larger than 0.1 cc/g, preferably not higher than 0.07 cc/g, which is very small as compared with from 0.3 to 0.4 cc/g in the case of conventional sea water magnesium hydroxide.

Further, the magnesium hydroxide of the present invention has a small oil absorption, and thus is suitable as a filler for resins. Specifically, the oil absorption is not higher than 70 ml/100 g, preferably not higher than 60 ml/100 g, as measured by the method of JIS K5101.

Thus, the magnesium hydroxide of the present invention is highly dense large particles having good roundness, high strength and good flowability, and it is suitable for use as a filler for various resins, and is particularly useful for the production of so-called artificial marble by incorporating it to an ester-type resin.

Further, the magnesium hydroxide of the present invention is useful as a starting material for the production of magnesium oxide having good water resistance (i.e. minimum hydration properties) by calcination.

Now, a suitable process for the production of magnesium hydroxide of the present invention will be described.

The magnesium hydroxide of the present invention is prepared by reacting a water soluble magnesium salt such as magnesium chloride, magnesium nitrate or magnesium sulfate, with ammonia under certain specific conditions. Among the water soluble magnesium salts, magnesium chloride is most preferred.

In the following, the process will be described in further detail with respect to the case where magnesium chloride is used as the water soluble magnesium salt.

There is no particular restriction as to the type of the crystallization apparatus for the production of magnesium hydroxide by the reaction of an aqueous magnesium chloride solution with ammonia. However, it is necessary that from 1 to 60% by weight, preferably from 3 to 40% by weight, of magnesium hydroxide solid is present in the aqueous magnesium chloride solution during the crystallization, i.e. the reaction solution is a slurry of an aqueous magnesium chloride solution containing magnesium hydroxide solid. Further, it is necessary that the load for crystallization of magnesium hydroxide in the crystallization apparatus is from 5 to 500 kg/m$^3$.hr, preferably from 30 to 120 kg/m$^3$.hr. Here, the load for crystallization means an amount (kg) of magnesium hydroxide solid crystallized in one hour per 1 m$^3$ of the magnesium chloride slurry containing the magnesium hydroxide solid in the crystallization apparatus. The amount of the solid corresponds to the increase in the weight of the solid content in the slurry. In the present invention, the reason for employing such specific crystallization conditions is as follows.

Namely, if the slurry concentration in the crystallization apparatus is less than 1% by weight, resulting magnesium hydroxide is likely to precipitate as fresh magnesium hydroxide having a fine particle size (for instance, an average particle size of less than 1 μm) instead of precipitating on the magnesium hydroxide solid already present in the slurry.

On the other hand, if the slurry concentration exceeds 60% by weight, the slurry viscosity tends to be too high to conduct uniform dispersion of ammonia supplied to the crystallization apparatus, whereby the particle size distribution of the resulting magnesium hydroxide will be wide.

If the load for crystallization exceeds 500 kg/m$^3$.hr, the precipitated particles tend to be fine particles of less than 5 μm. Therefore, the upper limit for the crystallization load is necessary. On the other hand, there is no particular restriction as to the lower limit for the crystallization load. However, if the load is less than 5 kg/m$^3$ .hr, it is necessary to use a large apparatus. Therefore, the load for crystallization is preferably at least 5 kg/m$^3$ .hr.

The slurry concentration in the crystallization apparatus may be maintained at a level of from 1 to 60% by weight by controlling the ratio of the amount of the clarified solution containing no solid content to the amount of the slurry containing the solid content withdrawn from the crystallization apparatus. Specifically, for instance, the clarified solution and the slurry may be withdrawn directly in a predetermined ratio from the apparatus. Otherwise, after such withdrawal or after withdrawing the slurry, the solid is separated from the slurry, or a slurry having a high concentration of the solid component is obtained by a solid-liquid separator, and one or both of the solid or the concentrated slurry and the clarified solution from the solid-liquid separator, are returned to the crystallization apparatus by controlling the amount of the feedback. Such specific methods can be employed as industrial methods.

The concentration of magnesium chloride supplied to the crystallization apparatus is preferably from 2 to 30% by weight. The reaction temperature is preferably from 20° to 80° C.

In the present invention, during the formation of magnesium hydroxide, ammonium chloride is produced as a by-product and recovered together with a small amount of unreacted magnesium chloride. The mother liquor separated from magnesium hydroxide and containing these substances, may be subjected to a conventional ammonium chloride distillation method with use of slaked lime and/or quick lime, whereby ammonium chloride is recovered as ammonia and can be reused, and calcium chloride produced as a by-product during the ammonium chloride distillation, may be used for the production of the starting material magnesium chloride by reacting it with sea water magnesium hydroxide.

Now, the resin composition of the present invention will be described.

In order to delay the reaction of magnesium hydroxide with the ester bond or the terminal carboxylic acid group of a curable compound, it is important that magnesium hydroxide itself is made as inactive as possible. The present inventors have made extensive study on this point, and as a result have found that it is possible to control the thickening effect of magnesium hydroxide to a practically trouble-free range when magnesium hydroxide having a substantially spherical form and having an average particle size of from 5 to 500 μm is used.

Commercially available conventional magnesium hydroxide is obtained by treating sea water with slaked lime, sodium hydroxide or the like in most cases. So-called sea water magnesium hydroxide thus obtained is primary particles or secondary particles having a hexagonal plate-like, irregular or needle-like shape in most cases, and the average particle size is in the order of sub-microns or at the largest, at a level of from 2 to 3 μm. When such magnesium hydroxide is used as a filler for a curable compound containing an ester bond and/or a terminal carboxylic acid group, the thickening effect is too great that such magnesium hydroxide is hardly useful as a filler.

It is surprising that such a problem is eliminated when the magnesium hydroxide of the present invention is employed. Namely, the magnesium hydroxide of the present invention has a substantially spherical particle form and has an average particle size of from 5 to 500 μm and a specific surface area of from 25 to 1 m$^2$/g as measured by BET method. The object of the present invention may be accomplished more effectively when the average particle size is preferably at least 10 μm (specific surface area: at most 7 m$^2$/g).

The reason why the thickening effect can be suppressed by the use of the magnesium hydroxide of the present invention is not completely understood. However, the small specific surface area of the magnesium hydroxide particles may be one of the main factors for the effectiveness.

The present inventors have further studied means for adequately accomplishing the object of the present invention, and have found also that when the magnesium hydroxide of the present invention is used in combination with a certain type of a surface treating agent, the object and the effects of the present invention can be remarkably improved. As the manner for the combination, it is preferred to cover the magnesium hydroxide with the surface treating agent. However, the surface treating agent may be blended to the resin component.

Suitable as such a surface treating agent, is a saturated or unsaturated fatty acid, a metal salt of a fatty acid, an ester of a fatty acid, a fatty acid ether, a surfactant, a silane coupling agent, a titanate coupling agent, or the like.

The surface treating agent is used in an amount of from 0.1 to 5% by weight, preferably from 0.3 to 3% by weight, relative to the magnesium hydroxide.

A drying method, a semi-drying method or a wet method may be employed as a method for covering the surface of the magnesium hydroxide with the surface treating agent. In a preferred embodiment, a titanate-type coupling agent is dissolved in a fluorine-type solvent, and the solution is mixed and dispersed with magnesium hydroxide by a high speed agitator such as a Henschell mixer, followed by the removal of the solvent.

The curable compound having an ester group and/or a carboxylic acid group and containing an unsaturated bond in the present invention, is a curable compound comprising a monomer or oligomer containing an addition polymerizable unsaturated group (i.e. an α, β-unsaturated group) and curable by the addition polymerization, or a mixture of such monomers or oligomers, and which creates the above-mentioned thickening problem when reacted with the conventional magnesium hydroxide. Such a curable compound may be a mixture with other monomers or oligomers copolymerizable therewith, or may contain oligomers or polymers having no unsaturated group, such as a thermoplastic polymer as a low shrinking agent or cured thermosetting polymer as a filler. For instance, the unsaturated polyester resin is, in many cases, a mixture of an unsaturated polyester oligomer (i.e. an oligomer having an ester bond and, in some cases, a carboxylic acid group) and a monomer containing no ester bond or carboxylic acid group, such as styrene. Such a curable compound or a mixture thereof is preferably liquid at normal temperature. However, it is possible to use those which are solid at normal temperature but which can be liquefied by heating. Specifically, the curable compound includes (a) an unsaturated polyester oligomer, (b) acrylic acid or methacrylic acid, or an oligomer thereof with another addition polymerizable monomer, (c) an acrylic acid ester or a methacrylic acid ester, or an oligomer thereof or an oligomer thereof with another addition polymerizable compound, (d) an ester of an oligomer having a hydroxyl group with an unsaturated carboxylic acid such as acrylic acid or methacrylic acid, (e) a reaction product of a compound or an oligomer having a reactive functional group such as an epoxy group or an isocyanate group with an unsaturated ester such as an acrylic acid ester or a methacrylic acid ester having a functional group such as a hydroxyl group reactive with said reactive group, (f) an ester of allyl alcohol such as diallylphthalate and (g) an unsaturated polycarboxylic acid such as maleic acid, or a monoester or polyester of such an unsaturated polycarboxylic acid with a monohydric or polyhydric alcohol. More specifically, the above (a) includes an unsaturated polyester oligomer having an unsaturated polycarboxylic acid residue such as a maleic acid residue, a fumaric acid residue or an itaconic acid residue and a saturated polyhydric alcohol residue such as an ethylene glycol residue, a 1,4-butanediol residue or a glycerol residue, and in some cases further containing a saturated polycarboxylic acid residue or an unsaturated polyhydric alcohol residue. Likewise, the above (b) includes a mixture or oligomer of acrylic acid or methacrylic acid with another monomer such as an acrylic acid ester, a methacrylic acid ester or styrene. The above (c) includes butyl acrylate, methyl methacrylate, 2-hydroxyethyl acrylate, ethyleneglycol dimethacrylate, trimethylolpropane triacrylate and other acrylic acid or methacrylic acid esters, oligomers including homopolymers and copolymers of such acrylic acid or methacrylic acid esters, and oligomers of such acrylic acid or methacrylic acid esters with other monomers. The above (d) includes esters of hydroxyl group-containing oligomers such as a polyester polyol, a polyether polyol or a hydroxyl group-containing polybutadiene, with acrylic acid or methacrylic acid. The above (e) includes a polyepoxy compound (an epoxy resin) such as bisphenol A-diglycidyl ether or its oligomer, and a reaction product (a so-called vinyl ester or acryl urethane) of an isocyanate group-containing compound or its prepolymer such as a polyisocyanate compound or a terminal isocyanate group polyurethane prepolymer, with a hydroxy group-containing acrylic acid or methacrylic acid ester such as 2-hydroxyethyl acrylate, a 2-hydroxyethyl methacrylate or glycerol diacrylate. As the mixture containing these curable compounds, there may be mentioned, in addition to mixtures of these curable compounds, mixtures of these curable compounds with other monomers such as styrene, vinyl toluene, chlorostyrene, acrylonitrile or acrylamide. As other monomers, styrene is particularly preferred. A particularly preferred curable compound or a mixture thereof is a curable resin which is liquid at normal temperature such as an unsaturated polyester resin as a mixture of an unsaturated polyester oligomer with styrene, a vinyl ester resin as a mixture of vinyl ester with styrene, methyl methacrylate or its oligomer (i.e. methyl methacrylate syrup). These curable resins are preferably curable by heating in the presence of a curing agent such as a peroxide or an azo compound. However, it may be cured at room temperature.

The curing agent may optionally be selected depending upon the type of the resin used and the curing conditions.

In the composition of the present invention, the magnesium hydroxide is used as a flame retarding filler or a bulking filler for resins. For the former purpose, the magnesium hydroxide is used in an amount of from 50 to 85% by weight when it is used alone, or may be in an amount of less than 50% by weight when it is used in combination with other flame retarding fillers. For the latter purpose, the magnesium hydroxide is used alone or in combination with other inorganic fillers in an amount of from 5 to 80% by weight although the amount may vary depending upon the particular purpose.

An artificial marble is required to have adequate flame retardancy and physical properties such as hardness and linear expansion, and it is preferred that the magnesium hydroxide is used in combination with the following inorganic fillers. The composition preferably comprises from 50 to 84% by weight of magnesium hydroxide and from 1 to 35% by weight of an inorganic filler. Further, the magnesium hydroxide component may be replaced by aluminum hydroxide within a limit of not exceeding 20% by weight. If aluminum hydroxide exceeds 20% by weight, the resulting shaped article tends to have distinctly poor heat resistance. When used as an electric or electronic insulation material, a composition similar to that of the artificial marble is required, and further the magnesium hydroxide and the inorganic filler are preferably preliminarily adequately subjected to surface treatment so that the insulation can be maintained for a long period of time.

As the inorganic filler to be used in combination with the magnesium hydroxide for the composition of the present invention, there may be mentioned asbestos, glass powder, calcium carbonate, calcium silicate, alumina, kaolin, talc, other clay mineral powder, glass fiber, carbon fiber, metal fiber, potassium titanate fiber, mica, crystalline or non-crystalline quartz powder, "silus" balloons, glass balloons and glass beads. Further, the inorganic filler includes an inorganic hydroxide such as aluminum hydroxide or calcium hydroxide, a flame retarding assistant agent such as antimony oxide or a phosphorus compound, an organic halogen flame retardant and various stabilizers and pigments. The type and the amount of such an inorganic filler may suitably be selected depending upon the particular purpose.

The composition of the present invention is obtained by uniformly mixing the above-mentioned curable compound, magnesium hydroxide and, if necessary, other additives as mentioned above. The mixing method itself may be optionally selected. For instance, a kneader, a multipurpose mixer, a dissolver (tradename: Disper), etc. may be used.

As an application example for the composition of the present invention, the magnesium hydroxide-filled unsaturated polyester resin composition is useful as a flame retarded building material having a high heat resistance or as a flame retarded insulation materials for electric or electronic parts by injection molding or heat press molding. Further, the composition prepared by incorporating the magnesium hydroxide to methyl methacrylate syrup or resin is useful as a decorative sheet around kitchen or as a decorative sheet for show windows in view of the excellent outer appearance of the molded product and excellent flame retardancy and smoke retardancy.

Now, the present invention will be described in further detail with reference to Exmaples. However, it should be understood that the present invention is by no means restricted by these specific Examples.

EXAMPLE 1

Sea water was decarbonized in a usual manner, and then treated with milk of lime by a conventional method to obtain a magnesium hydroxide slurry. The slurry was separated by filtration under reduced pressure. Magnesium hydroxide thereby obtained was a wet cake having a MgO concentration of 34.0% by weight and contained the following impurities: CaO=0.41, $SiO_2$=0.12, $Al_2O_3$=0.12, $Fe_2O_3$=0 03, $B_2O_3$32 0.09 and $SO_3$=1.0 (unit: % by weight).

To 1 kg of such a magnesium hydroxide wet cake, 6.55 kg of an aqueous solution containing 20.0% by weight of calcium chloride and 2.0% by weight of magnesium chloride was added, and then carbon dioxide having a concentration of 100% was reacted and absorbed at a temperature of 60° C. The reaction product was separated by filtration to obtain an aqueous solution containing 12.7% by weight of magnesium chloride. The aqueous magnesium chloride solution was acidified with hydrochloric acid and subjected to decarbonization treatment by aeration. Then, while adequately stirring the aqueous solution by a stirrer, 21 kg/hr of such a solution and 2.2 $Nm^3$/hr of ammonia gas were continuously supplied to a reactor having an internal capacity of 35 liter and containing magnesium hydroxide crystals as seed crystals to precipitate magnesium hydroxide crystals while maintaining the temperature at 40° C. The load for crystallization of magnesium hydroxide was 40 kg/$m^3$. hr, and the slurry concentration was 6% by weight. The precipitates of magnesium hydroxide were separated by filtration, washed with water and then dried at 140° C. The magnesium hydroxide thus obtained, had the following composition: MgO=68.7, CaO=0.06, $SiO_2$=0.04, $Al_2O_3$=0.01, $Fe_2O_3$=0.001, $B_2O_3$=0.09 and $SO_3$=0.01 (unit: % by weight).

Figure 4:
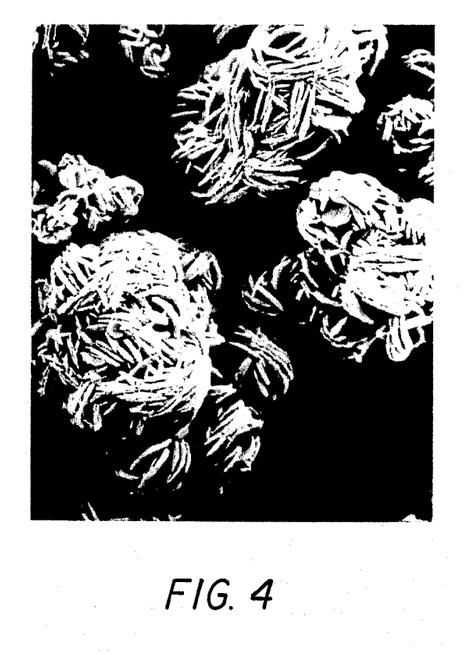
FIG. 4 is an electron microscopic photograph with 5000 magnifications showing the particle structure of a secondary particle having an average particle size of 30 μm as magnesium hydroxide of the present invention obtained in Example 1.

The magnesium hydroxide thus obtained was observed by an electron microscope with 5000 magnifications. As shown in FIG. 4, a number of primary flake particles are aggregated in various directions, and the flakes are oriented substantially radially outwardly from the center. The thickness of each flake was from 200 to 1000 Å. It was a substantially spherical particle having an average particle size of 30 μm.

Further, the strain in the <101> direction of the primary flake particles was $1.8 \times 10^{-3}$. The specific surface area was 3 $m^2$/g as measured by BET method using nitrogen gas, and the specific gravity of the particles was 2.27 as measured by the method of JIS Z8807.

The packing apparent specific gravity of this secondary particle was 1.4, the angle of repose was 37°, and the oil absorption was 35 ml/100 g as measured in accordance with JIS K5101.

The total pore volume of pores having sizes of at most 0.5 μm in the secondary particle was 0.03 cc/g.

EXAMPLE 2

Magnesium hydroxide was obtained in the same manner as in Example 1 except that an aqueous solution containing 12.7% by weight of magnesium chloride obtained from bittern was supplied at a rate of 55 kg/hr., ammonia was supplied at a rate of 5.8 $Nm^3$/hr, the load for crystallization was 105 kg/$m^3$ .hr and the magnesium hydroxide slurry concentration was 30% by weight. The magnesium hydroxide thus obtained was a particle having an average particle size of 300 μm and having a structure as shown in FIGS. 1 and 2.

The thickness of each primary flake particle was from about 300 to about 1500 Å, and the strain in the <101> direction was $1.0 \times 10^{-3}$. Other properties measured in the same manner as in Example 1 were as follows:
Specific surface area: 1.1 $m^2$/g
Specific gravity of particles: 2.28
Packing apparent specific gravity: 1.37
Oil absorption: 30 ml/100 g
Pore volume: 0.02 cc/g

EXAMPLE 3

Magnesium hydroxide of the present invention was obtained in the same manner as in Example 2 except that the load for crystallization was changed to 350 kg/$m^3$ .hr and the slurry concentration was changed to 45% by weight.

The properties of this magnesium hydroxide were as follows:
Average particle size: 11 μm
Specific surface area: 7 $m^2$/g
Thickness of primary flake particle: 150–800 Å
Strain in the <101> direction of primary flake particle: $1.66 \times 10^{-3}$
Specific gravity of particles: 2.28
Packing apparent specific gravity: 0.95
Oil absorption: 46 ml/100 g
Pore volume: 0.05 cc/g

COMPARATIVE EXAMPLE 1

With respect to sea water magnesium hydroxide having an average particle size of 1.5 μm obtained by a usual method, the properties were measured in the same manner as in Example 1. The results were as follows:
Specific surface area: 41 $m^2$/g
Strain in the <101> direction: $3.7 \times 10^{-3}$
Specific gravity of particles: 2.13
Packing apparent specific gravity of the powder: 0.61
Oil absorption: 75 ml/100 g
Pore volume: 0.32 cc/g

COMPARATIVE EXAMPLE 2

Magnesium hydroxide was prepared in accordance with Example 1 of Japanese Unexamined Patent Publication No. 115799/1977.

The properties of the magnesium hydroxide thus obtained were as follows:
Average particle size: 0.9 μm
Specific surface area: 4.2 $m^2$/g
Strain in the <101> direction: $1.2 \times 10^{-3}$
Specific gravity of particles: 2.31
Packing apparent specific gravity of particles: 0.70

COMPARATIVE EXAMPLE 3

Magnesium hydroxide was crystallized in the same manner as in Example 2 except that the load for crystallization was changed to 600 kg/$m^3$ .hr and the slurry concentration was changed to 0.5% by weight. The properties of the magnesium hydroxide thus obtained were as follows.
Average particle size: 2.1 μm
Specific surface area: 33 $m^2$/g
Thickness of primary particle: 110–330 Å
Strain in the <101> direction: $2.1 \times 10^{-3}$
Strain of particles: 2.29
Packing apparent specific gravity of particles: 0.75
Oil absorption: 80 ml/100 g
Pore volume: 0.20 cc/g

EXAMPLE 4 and COMPARATIVE EXAMPLES 4 and 5

Ammonia gas was blown into an aqueous magnesium chloride slurry containing 10% by weight of magnesium hydroxide to crystallize magnesium hydroxide at a load of crystallization of 100 kg/m$^3$ .hr. The average particle size of the magnesium hydroxide particles was 20 μm (specific surface area: 4 m$^2$/g; test sample A).

Magnesium hydroxide having an average particle size of 35 μm was crystallized in the same manner as above except for a slight modification of the crystallization conditions, and the crystals were pulverized by an air jet mill to obtain irregularly shaped magnesium hydroxide having an average particle size of 10 μm (test sampel B).

Commercially available hexagonal plate-like magnesium hydroxide having an average particle size of 0.8 μm was prepared (test sample C).

Then, 250 g of an unsaturated polyester resin (#2042AP, manufactured by Japan Upica Co., Ltd.) was blended with 250 g of each of test samples A, B and C, respectively, to obtain three different types of compositions. Each composition was stirred in a small size dissolver-type stirrer for 20 minutes, whereby the kneading state was observed and the viscosity was measured immediately after the kneading and 24 hours later by a B-model rotary viscometer.

The results are shown in Table 1.

TABLE 1

| | Kneading state | Viscosity immediately after kneading (poise) | Viscosity after 24 hours (poise) |
|---|---|---|---|
| Example 4 (Test sample A) | Good | 3600 | 12000 |
| Comparative Example 4 (Test sample B) | Good | 12000 | 57000 |
| Comparative Example 5 (Test sample C) | Kneading impossible | — | — |

EXAMPLES 5 to 8 and COMPARATIVE EXAMPLES 6 and 7

In the same manner as in Example 4, various spherical magnesium hydroxide particles having particle sizes of from 1 to 100 μm were prepared by modifying the conditions for crystallization, and the thickening properties of the compositions were tested in the same manner as in Example 4. The results are shown in Table 2.

TABLE 2

| | Average particle size (μm) | Specific surface area (m$^2$/g) | Kneading state | Viscosity immediately after kneading (poise) | Viscosity after 24 hours (poise) |
|---|---|---|---|---|---|
| Comparative Example 6 | 1.0 | 35 | Fair | 21000 | 95000 |
| Comparative Example 7 | 3.0 | 26 | Fair | 7000 | 45000 |
| Example 5 | 5.0 | 12 | Good | 4300 | 21000 |
| Example 6 | 10 | 7 | Good | 3500 | 17500 |
| Example 7 | 50 | 2 | Good | 2800 | 7300 |
| Example 8 | 100 | 1.5 | Good | 2500 | 5900 |

EXAMPLES 9 to 13

To spherical magnesium hydroxide particles having an average particle size of 20 μm obtained in the same manner as in Example 4, the surface treating agents as shown in Table 3 were applied 2% by a semi-drying method, and then the thickening properties against the unsaturated polyester resin were tested in the same manner as in Example 4. The results are shown in Table 3 together with the results of Example 4.

TABLE 3

| | Surface treating agents | Kneading state | Viscosity immediately after kneading (poise) | Viscosity after 24 hours (poise) |
|---|---|---|---|---|
| Example 4 | None | Good | 3000 | 12000 |
| Example 9 | Stearic acid | Good | 2100 | 2400 |
| Example 10 | Sodium stearate | Good | 2050 | 2450 |
| Example 11 | Glycerol monostearyl ester | Good | 2010 | 3500 |
| Example 12 | Glycidyl silane coupling agent | Good | 2500 | 3900 |
| Example 13 | Tetrastearyl titanate | Good | 1850 | 2100 |

EXAMPLE 14

60% by weight of the magnesium hydroxide obtained in Example 4, 20% by weight of methyl methacrylate syrup (#MC-1003, manufactured by Mitsui Toatsu) and 20% by weight of methyl methacrylate monomer were mixed, and stirred for 20 minutes in a small size disper-type stirrer, whereupon the kneading state was observed, and the viscosity was measured immediately after the kneading and 3 hours later by a B-model rotary viscometer. The results are shown in Table 4.

EXAMPLE 15

The mixing, kneading and evaluation were conducted in the same manner as in Example 14 except that the magnesium hydroxide obtained in Exmaple 12 was used instead of the magnesium hydroxide obtained in Example 14. The results are shown in Table 4.

EXAMPLE 16

50% by weight of the magnesium hydroxide obtained in Example 12, 10% by weight of glass powder (manufactured by Ferro Enamel Ltd.), 20% by weight of methyl methacrylate syrup (#MC-1003, manufactured by Mitsui Toastu) and 20% by weight of methyl methacrylate monomer were mixed, kneaded and evaluated. The results are shown in Table 4.

TABLE 4

| | Kneading state | Viscosity immediately after kneading (poise) | Viscosity after 3 hours (poise) |
|---|---|---|---|
| Example 14 | Good | 3350 | 9700 |
| Example 15 | Good | 2100 | 3940 |

TABLE 4-continued

| | Kneading state | Viscosity immediately after kneading (poise) | Viscosity after 3 hours (poise) |
|---|---|---|---|
| Example 16 | Good | 1650 | 3420 |

We claim:

1. Magnesium hydroxide of a substantially spherical particle form having an average particle size of from 5 to 500 μm and a specific surface area of from 25 to 1 m²/g.

2. The magnesium hydroxide according to claim 1, which is a secondary particle formed by aggregation of a number of primary particles.

3. The magnesium hydroxide according to claim 2, wherein the strain of the primary particles in the <101> direction is not higher than $4 \times 10^{-3}$.

4. The magnesium hydroxide according to claim 3, wherein the secondary particle has a packing apparent specific gravity of at least 0.8.

5. The magnesium hydroxide according to claim 2, wherein the primary particles are flake particles having a thickness of from 100 to 5000 Å.

6. The magnesium hydroxide according to claim 2, wherein the secondary particle has an oil absorption of not higher than 70 ml/100 g.

7. The magnesium hydroxide according to claim 5, wherein the primary flake particles are oriented substantially radially outwardly from the center of the secondary particle.

8. The magnesium hydroxide according to claim 2, wherein the total pore volume of pores having particle sizes of at most 0.5 μm in the secondary particle is not higher than 0.1 cc/g.

9. A process for producing magnesium hydroxide, which comprises reacting an aqueous solution containing a water-soluble magnesium salt, with ammonia while controlling the load for crystallization of magnesium hydroxide at a level of not higher than 500 kg/m³·hr and the magnesium hydroxide slurry concentration in the crystallization apparatus at a level of from 1 to 60% by weight, to have magnesium hydroxide crystallized as substantially spherical particles having an average particle size of from 5 to 500 μm and a specific surface area of from 25 to 1 m²/g.

10. The process according to claim 9, wherein the water-soluble magnesium salt is selected from the group consisting of magnesium chloride, magnesium nitrate and magnesium sulfate.

11. A resin composition prepared by blending a curable compound having an ester bond and/or a carboxylic acid group and containing an unsaturated bond, or a mixture containing such a curable compound, with from 5 to 85% by weight, based on the curable compound, of magnesium hydroxide particles of a substantially spherical particle form having an average particle size of from 5 to 500 μm and a specific surface area of from 25 to 1 m²/g as measured by BET method, followed by curing.

12. The resin composition according to claim 11, wherein the magnesium hydroxide particles are formed by aggregation of a number of primary particles.

13. The resin composition according to claim 11, wherein the magnesium hydroxide particles are surface-treated.

14. The resin composition according to claim 11, wherein the curable compound is a monomer or oligomer capable of forming an unsaturated polyester resin, an acrylic resin or a methacrylic resin, or a mixture thereof.

15. A resin composition comprising (a) from 15 to 50% by weight of a curable compound having an ester bond and/or a carboxylic acid group and containing an unsaturated bond, or a mixture containing such a curable compound, (b) from 50 to 84% by weight of a mixture of aluminum hydroxide and magnesium hydroxide of a substantially spherical particle form having an average particle size of from 5 to 500 μm and a specific surface area of from 25 to 1 m²/g as measured by BET method, the amount of the aluminum hydroxide being not higher than 20% by weight, and (c) from 1 to 35% by weight of at least one additive selected from the group consisting of asbestos, glass powder, calcium carbonate, calcium silicate, kaolin, talc, clay, glass fiber, carbon fiber, metal fiber, potassium titanate fiber, mica, crystalline or non-crystalline quartz powder, "silus" balloons, glass balloons, glass beads and alumina.

* * * * *